(12) United States Patent
Newman et al.

(10) Patent No.: US 11,754,425 B2
(45) Date of Patent: Sep. 12, 2023

(54) NON-INTRUSIVE TRACKING OR LOCATING OF OBJECTS IN PIPELINES AND WELLBORES FROM A SINGLE LOCATION

(71) Applicant: Halliburton Energy Services, Inc., Houston, TX (US)

(72) Inventors: Stephen Christopher Newman, Aberdeen (GB); Graham Peter Jack, Newburgh (GB)

(73) Assignee: Halliburton Energy Services, Inc., Houston, TX (US)

(*) Notice: Subject to any disclaimer, the term of this patent is extended or adjusted under 35 U.S.C. 154(b) by 190 days.

(21) Appl. No.: 17/349,845

(22) Filed: Jun. 16, 2021

(65) Prior Publication Data
US 2022/0404180 A1  Dec. 22, 2022

(51) Int. Cl.
*G01D 5/42* (2006.01)

(52) U.S. Cl.
CPC ..................... *G01D 5/42* (2013.01)

(58) Field of Classification Search
CPC .................. G01D 5/42; F16L 55/48
See application file for complete search history.

(56) References Cited

U.S. PATENT DOCUMENTS

| | | |
|---|---|---|
| 4,590,799 A | 5/1986 | Brown et al. |
| 5,417,112 A | 5/1995 | Rosenberg |
| 5,549,000 A | 8/1996 | Brown et al. |
| 5,558,274 A * | 9/1996 | Ben-Aissa ............ F24F 3/052 236/13 |
| 6,384,738 B1 | 5/2002 | Carstensen et al. |
| 6,993,963 B1 | 2/2006 | Gudmundsson |

(Continued)

FOREIGN PATENT DOCUMENTS

| | | |
|---|---|---|
| EP | 1188265 | 6/2011 |
| WO | 2006054054 | 5/2006 |

(Continued)

OTHER PUBLICATIONS

Downhole Diagnostic, Acoustic Fluid Level Surveys, 2020. Available at https://www.downholediagnostic.com/fluid-level, Accessed Jun. 1, 2021.

(Continued)

*Primary Examiner* — Francis C Gray
(74) *Attorney, Agent, or Firm* — Thomas Rooney; C. Tumey Law Group, PLLC

(57) ABSTRACT

Systems and methods of the present disclosure relate to non-intrusive tracking or locating of objects in a conduit from a single location. A system comprises a vessel comprising a pressurized fluid, a valve positioned to control a flow of the pressurized fluid into the conduit to induce at least one pressure wave directed at the object, a pressure transducer in fluid communication with the conduit, the pressure transducer positioned to measure at least one pressure response in the conduit due to contact of the at least one pressure wave with the object, and a system controller operable to: receive pressure data from the pressure transducer, wherein the pressure data includes the at least one pressure response and determines a distance of the object in the conduit, relative to a reference point, based on the at least one pressure response.

20 Claims, 3 Drawing Sheets

(56) References Cited

U.S. PATENT DOCUMENTS

| | | | |
|---|---|---|---|
| 7,222,549 B2 | 5/2007 | Abney | |
| 9,188,502 B2* | 11/2015 | Hawwa | G01M 3/2823 |
| 9,535,039 B2 | 1/2017 | Farque et al. | |
| 9,599,272 B2 | 3/2017 | Hartog et al. | |
| 10,711,599 B2 | 7/2020 | Jaaskelainen et al. | |
| 10,996,129 B2* | 5/2021 | Da Silva | F16L 55/46 |
| 2005/0210960 A1* | 9/2005 | Shamout | G01M 3/243 |
| | | | 73/592 |
| 2017/0268714 A1 | 9/2017 | Giron et al. | |
| 2021/0332953 A1* | 10/2021 | Jagannathan | G01M 3/243 |

FOREIGN PATENT DOCUMENTS

| | | |
|---|---|---|
| WO | 2019-156661 | 8/2019 |
| WO | 2020-162964 | 8/2020 |

OTHER PUBLICATIONS

CIRCOR, Pipeline Engineering, Pipeline Blockage Detection—Acoustek®, Available at https://www.circor.com/services/pipeline-blockage-detection-acoustek, Accessed Jun. 1, 2021.

Paradigm Flow Services, Find-Block®. Available at https://www.paradigm.eu/products/technology-category/find-block, Brochure accessed Jun. 7, 2021.

International Search Report and Written Opinion for Application No. PCT/US2021/038748, dated Mar. 8, 2022.

\* cited by examiner

NON-INTRUSIVE TRACKING OR LOCATING OF OBJECTS IN PIPELINES AND WELLBORES FROM A SINGLE LOCATION

BACKGROUND

Stuck pigs and hydrates may be difficult to locate within a pipeline. Current state of the art pig tracking typically requires numerous pieces of equipment. For example, equipment may be attached to the pipeline pig and additional equipment may be attached to the outside of the pipeline to track a pigging location. Tracking the pig is typically performed by monitoring pig signalers at set locations along the pipeline.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for non-intrusive tracking or locating of objects within conduits such as, for example, low-pressure pipelines or wellbores. The low pressures within the conduit may range for example from about ambient pressure to about 5 bar or to about 10 bar. The tracked objects may include pipeline pigs or hydrates, among other objects. In some examples, the hydrates may be tracked during hydrate remediation operations.

In particular examples, tracking the objects in the low-pressure conduits may occur by passing high-pressure fluid into the conduit to induce a longitudinal pressure wave that may travel down the conduit to the object (e.g., a blockage) and reflect back in a direction toward the location of the pressure wave inducement. The duration it may take for the pressure wave to travel to the object and return may be measured using a high-frequency and high-resolution pressure transducer. The speed of the longitudinal wave may be calculated based on the medium in the conduit. The distance to the object may then be calculated from the duration of travel and the speed of travel.

To create the longitudinal positive pressure wave, pressurized fluid may be stored in a vessel such as for example, a length of pipe or a pressure vessel. The high-pressure fluid may be passed (e.g., injected or released) into the conduit via a valve. The valve may be opened for a short duration to detect near blockages and may be opened for a longer duration for blockages further away.

The object within the conduit may be moving or stationary. Tracking of the object in the conduit may occur in real-time via an analysis of at least one induced pressure wave and its corresponding response. The tracking may be performed to determine a real-time location, such as a depth or a distance of the object within the conduit, relative to a reference point such as, for example, a position of the source of the pressure wave inducement or the pressure transducer.

In some examples, at least two pressure waves may be induced to elicit or cause at least two corresponding pressure responses that may reflect off of the desired target or object, and travel as pressure responses (e.g., reflections or reflexes) back to the source of the pressure wave inducement for analysis by a system controller. The analysis may be automated and repeated to track the objects, and locations of the objects may be indicated on a map that may be accessible via a web portal, for example.

Figure 1:
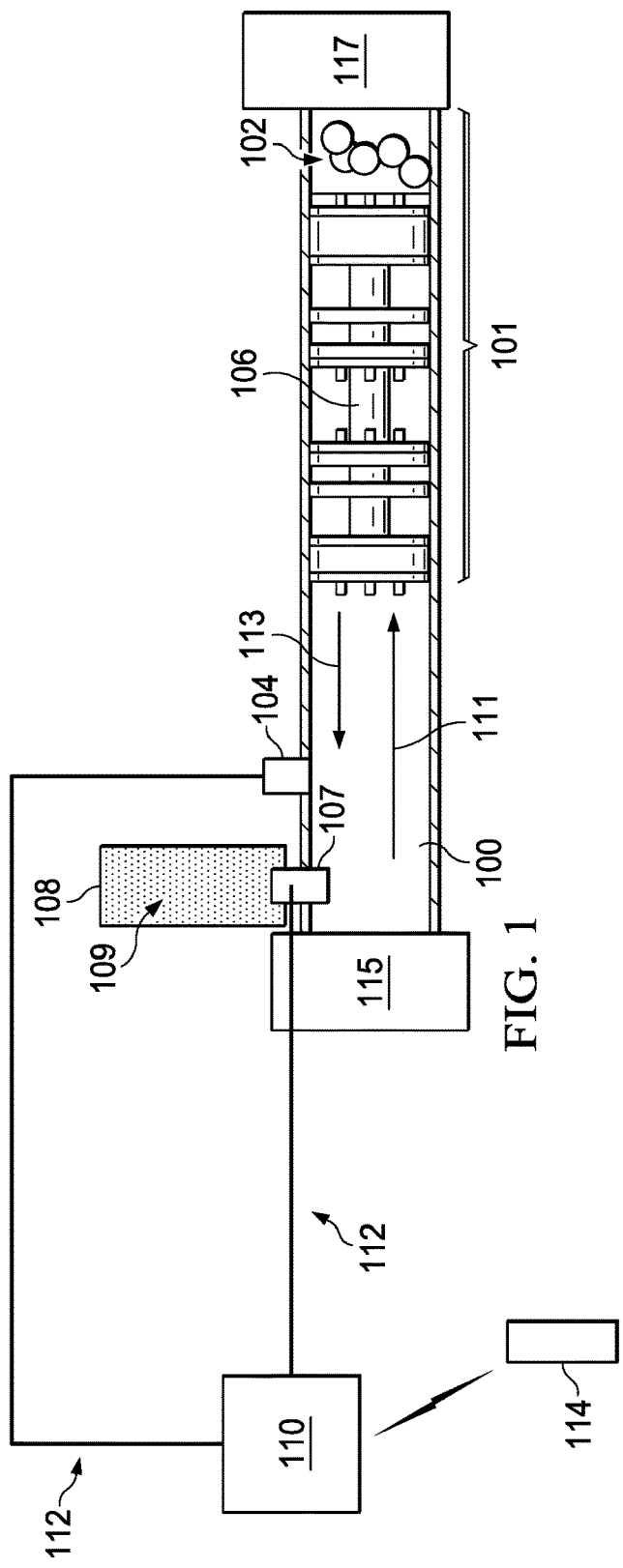
FIG. 1 illustrates a system for tracking an object in a conduit from a single location, in accordance with examples of the present disclosure.

FIG. 1 illustrates a conduit 100 with an object 101 disposed downstream from a pressure transducer 104, in accordance with examples of the present disclosure. The conduit 100 may represent a pipeline or a wellbore, in certain examples. The pressure transducer 104 may be in fluid communication with contents of the conduit 100 to indicate an internal pressure of the conduit 100. The conduit 100 may include a low pressure such as for example, from about ambient pressure to about 5 bar or to about 10 bar. The pressure transducer 104 may be disposed at a location (e.g., a reference point) along the conduit 100, and may sample data at a rate of at least 50 Hz data frequency with an accuracy of 0.1 bar or better (e.g., 4 kilohertz (kHz) and 0.001 bar accuracy). In some examples, 1-4 kHz or greater than 4 kHz may be a suitable range.

The object 101 may include a variety of debris 102 (e.g., hydrates) that may impede a flow of fluid(s) therethrough. Additionally, the object 101 may include a pipeline pig 106, in some examples. The conduit 100 may also include a valve 107 to control flow such as an ingress of fluid from a vessel 108 containing fluid 109 stored at a high pressure. Any suitable pressure vessel (e.g., a metal vessel) and valve (e.g., mechanical, electromechanical, solenoid) may be used for supplying the fluid 109 into the conduit 100 at the desired pressure. In some examples, the vessel 108 may include a pipe. Different sized pipes and vessels may be used to store the fluid 109. For example, a length of pipe or pressure vessel attached to a pipeline or wellbore of interest may include, about 50 meters of 2-inch pipe or an equivalent volume pressure vessel may be used for a larger diameter pipe (e.g., 30-inch diameter). A shorter length and smaller diameter of pipe or smaller pressure vessel may be suitable for analysis of smaller diameter pipelines. In some examples, existing infrastructure of the location (e.g., a section of pipe and/or a valve) may be utilized to provide the pressure vessel or pipe and control of fluid therefrom.

A suitable high-pressure may include pressures up to the maximum pressure the conduit 100 may safely withstand without structural damage, such as a maximum allowable operating pressure (MAOP). In examples, the MAOP may not exceed the design pressure of the weakest portion of the conduit 100, or a maximum safe pressure determined by an operator. The fluid 109 may be stored at a pressure sufficient to cause the MAOP for the conduit 100 to be reached as the fluid 109 passes into the conduit 100. Non-limiting examples of the fluid 109 may include gas such as nitrogen into a gas system, or water (or other suitable liquid) into a liquid system. Adjusting the pressure may change characteristics (e.g., amplitude) of the wave. For example, a larger pressure may produce a pressure wave with a larger amplitude as compared to a lower pressure and the corresponding smaller pressure wave. Also, a longer duration of the valve 107 remaining open may produce a longer longitudinal wave (e.g., a pulse).

Positive pressure waves may be induced within the conduit 100 by manipulation of the valve 107. For example, the fluid 109 may be passed into the conduit 100 via the valve 107 that may be opened (e.g., fully open) and closed as desired. In some examples, the valve 107 may be remain open for a short duration such as less than 1 second or less than ½ second, to detect near blockages, and a longer duration (e.g., about 2-5 seconds or longer) for blockages further away. A different length of longitudinal wave may be produced by leaving the valve 107 open for a longer or shorter period of time. Different amplitudes of the longitudinal wave may also be produced by varying pressures in the vessel 108.

In some non-limiting examples, far blockages may be at a distance ranging from 10 kilometers (km) (6 miles) to 300 km (186 miles) relative to the location of the pressure wave inducement. In other non-limiting examples, near blockages may be at a distance ranging from 100 meters (m) (0.1 miles) to 10 km relative to the location of the pressure wave inducement.

The pressure waves may be induced at regular intervals, or the intervals may be variable, and may travel to and from the object 101 indicated by directional arrows 111 and 113. The directional arrow 111 indicates a direction of the induced pressure wave(s), and the directional arrow 113 indicates the pressure response(s).

In some examples, there may be multiple objects at multiple locations in the conduit 100. In particular examples, longitudinal pressure waves may be induced at regular or variable intervals and may be utilized in accordance with examples of the present disclosure. In some examples, the inducement of the pressure waves may occur manually. In other examples, the inducement of pressure waves may be automated via a system controller.

In some examples, a system controller 110 may control fluid flow into the conduit 100. For example, the system controller 110 may be operable to control the valve 107, to induce the pressure waves that may travel through the conduit 100 eliciting a pressure response. The pressure response includes a reflected pressure wave that has been reflected off the object 101 (or the desired target) back to the source of the pressure wave inducement. The reflected pressure wave or response may be measured by the pressure transducer 104 and recorded by the system controller 110 for analysis, such as determining pressure profiles of single phase and multi-phase fluids in the conduit 100 and/or determining a location of an object in the conduit 100. Upon manipulating the valve 107, a fluid flow may temporarily be stopped or restricted to induce a pressure wave in the conduit 100, and a pressure in the conduit 100 may be continuously recorded and analyzed, using the Joukowsky equation, for example:

$$\Delta p_a = \rho u a \qquad (1)$$

where $\Delta p_a$ represents a surge pressure; $\rho$ represents a fluid density, u represents a fluid flowing velocity and a represents the speed of sound in the fluid, to estimate the magnitude of the water hammer and using the Darcy-Weisbach equation:

$$\Delta p_f = \left(\frac{f}{2}\right)\left(\frac{\Delta L}{d}\right)\rho u^2 \qquad (2)$$

where f is the friction factor, L is a pipe length, d is a pipe diameter, $\rho$ is fluid density and u is fluid velocity, to determine the frictional pressure drop, thereby obtaining a time-log of the pressure change in the conduit. A distance-log of pressure change may be obtained from the time-log and an estimate of the speed of sound in the actual multi-phase flow media, using the formula:

$$\Delta L = 0.5 a \Delta t \qquad (3)$$

to obtain the relation between time ($\Delta t$) and distance ($\Delta L$). This technique may be useful for detecting, tracking, and/or locating leakages, inflow, deposits, and collapses, various objects and/or blockages, for example. In some examples, a system controller may determine the location of the object in a pipeline or wellbore relative to a location of a measured pressure response or a location of the pressure wave inducement via Equations 1 to 3. For example, the system controller may calculate a distance from a pressure transducer to the object as half the distance a pressure wave travels from the time of the pressure wave inducement to the time the pressure response is measured or received by the pressure transducer. The distance between the pressure transducer and the object may be utilized to calculate a distance to the object relative to a pressure inducement location such as a valve or pump, for example.

The system controller 110 may include a display, a storage unit, and/or any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the system controller 110 may be a computer, a network storage device, or any other suitable device and may vary in size, shape, performance, functionality, and price. The system controller 110 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The system controller 110 may also include input device(s) (e.g., keyboard, mouse, touchpad, etc.) and output device(s) (e.g., monitor, printer, etc.). The input device(s) and output device(s) provide a user interface. For example, the system controller 110 may enable an operator to select and perform analysis, view collected data, view analysis results, and/or perform other tasks. The system controller 110 may be in communication (e.g., wire or wireless) with various components such as the pressure transducer 104 and the valve 107 via communication paths 112 (e.g., wires). In some examples, the system controller 110 may be operated remotely (e.g., wirelessly) via a device 114 which may include a personal computer, tablet, smartphone, or other digital device. The system controller 110 may be in communication (e.g., wire or wireless) with various components via communication paths 112. In some examples, the system controller 110 may be battery-powered (e.g., rechargeable lithium-ion battery) with up to 10 hours of operation time and may include piezoelectric switches. In other examples, the system controller 110 may be powered by an electric grid and/or a portable generator.

In some examples, observed pressure, calculated distance traveled, pressure variations in the conduit 100, and flow lost through or around the object 101 may be calibrated. After the calibration, a pressure measurement near a pig launcher 115 or a pig receiver 117 may be continuously monitored and used to calculate the object's location in real time.

Figure 2:
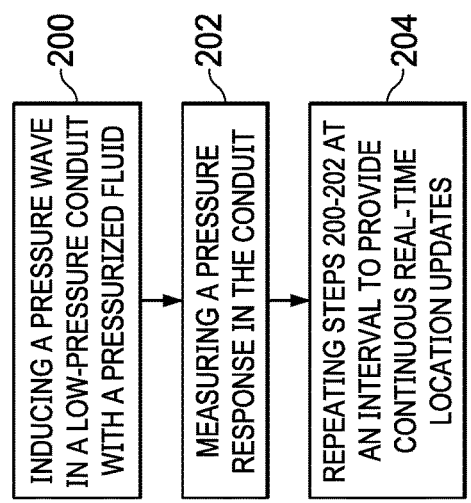
FIG. 2 illustrates a flow chart for tracking objects within pipelines and/or wellbores, in accordance with examples of the present disclosure.

FIG. 2 illustrates a flow chart for tracking of moving or stationary objects within a low-pressure conduit, in accordance with examples of the present disclosure. At step 200, a pressure wave may be induced within the conduit (e.g., the conduit 100 shown on FIG. 1) with a high-pressure vessel (e.g., the vessel 108 shown on FIG. 1). In some examples, multiple pressure waves may be induced for tracking of moving objects.

As previously described, the pressure wave(s) may be induced via the high-pressure vessel by controlling flow into the conduit via a valve (e.g., the valve 107 shown on FIG. 1) within a suitable time period. The pressure wave(s) may have similar or different properties such as frequencies and/or amplitudes depending on the pressure of the vessel, in some examples. The pressure wave(s) may travel along a bore of the conduit to an object (e.g., the object 101 shown on FIG. 1) and reflect back to an end of the conduit where the wave(s) were induced or the source of the pressure wave inducement. The reflected pressure wave(s) may be considered pressure responses in the conduit 100.

At step 202, the pressure response(s) in the conduit may be measured. In some examples, the pressure waves may be induced before either pressure response is measured. In other examples, a first response may be measured before a second response is measured. The pressure response waves may be measured by the pressure transducer (e.g., the pressure transducer 104 shown on FIG. 1). The system controller (e.g., the system controller 110 shown on FIG. 1) may analyze the pressure data.

At step 204, the preceding steps may be repeated at an interval to provide continuous real-time location updates using Equations 1-3, for example. The analysis of the pressure responses may occur on site or the pressure responses may be transmitted offsite for analysis. A current location may be compared to a previous location to determine a velocity of the object in the conduit. An automated warning system (e.g., the system controller 110 shown on FIG. 1) may send a message (e.g., text, email) to a user when an object velocity fails to satisfy a threshold or is deemed to be too high or too low. In certain examples, a flow rate of fluid in a conduit may be adjusted by an operating plant to decrease or increase the velocity of the object (e.g., a pipeline pig), as desired.

The automated warning system may also communicate (e.g., email, text message) to a user when the pig or object velocity is zero, indicating that the object is stuck or stationary. In some examples, the interval may be variable or set. A time period for each interval may include any interval longer than the time required for a wave to travel the entire length of the conduit and return to the data recorder (e.g., the pressure transducer 104). This may be calculated on a case-by-case basis, and kept as short as possible, such as, for example, 1 minute for a 30-kilometer conduit full of water.

Location updates or location information may be transmitted to a web portal to provide a map and live tracking of the object. In some examples, the analysis may be performed on multiple pipelines and resulting data may be cross-referenced to ensure accuracy.

Figure 3:
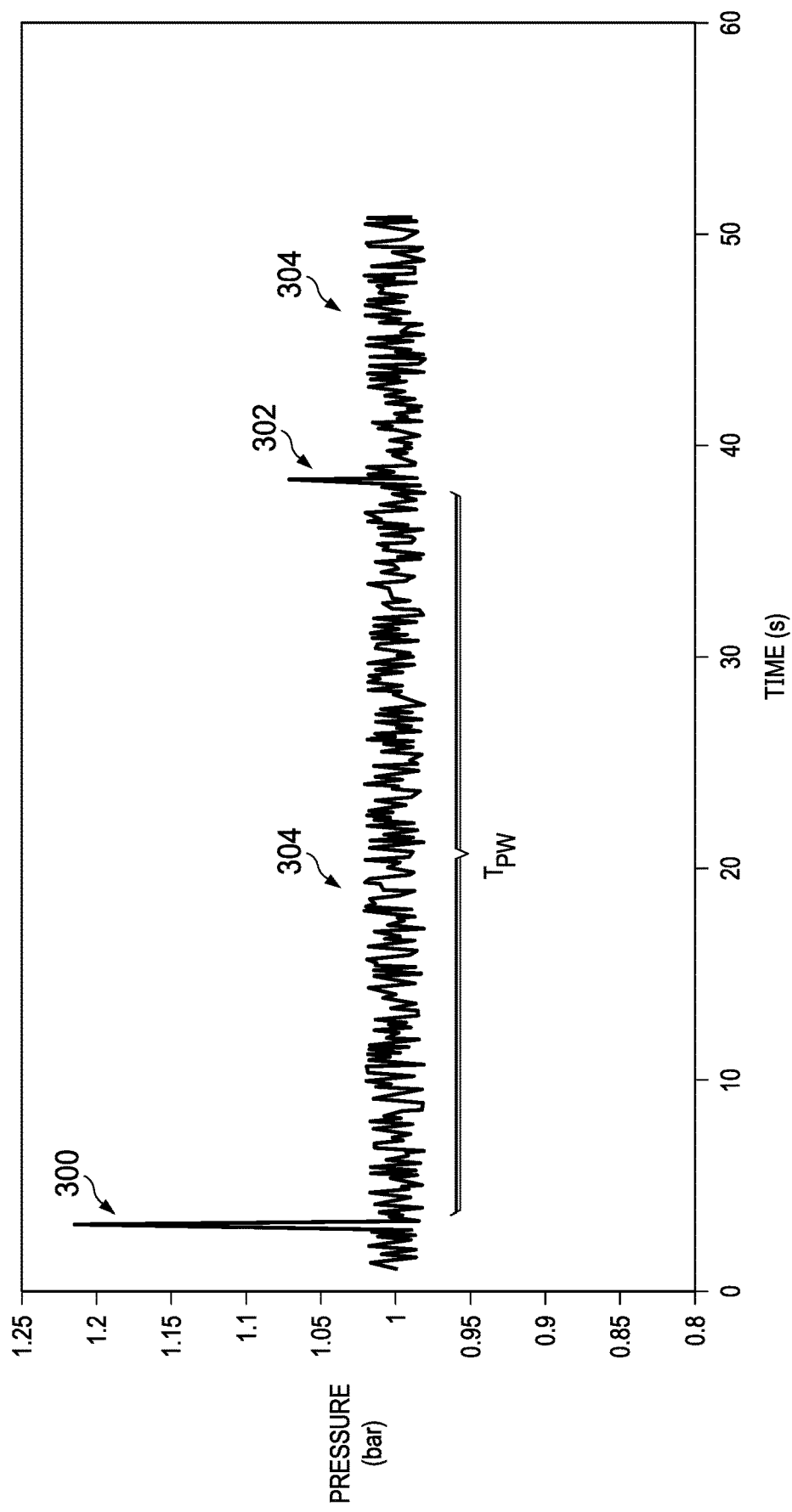
FIG. 3 illustrates a pressure response during object tracking or locating, in accordance with examples of the present disclosure.

FIG. 3 illustrates pressure responses during object tracking, in accordance with examples of the present disclosure. A pressure wave 300 may be induced to travel down a conduit and contact the object to elicit a pressure response 302 (e.g., a reflection of the induced pressure wave 300). Residual data 304 such as residual pressure waves, for example, is also illustrated, however, the residual data 304 may not be relied upon to track the object. As previously noted, the speed of sound in the fluid and the time from the pressure wave inducement to the first pressure response 302 may be calculated.

A distance from the pressure transducer to the object in a pipeline or wellbore may be calculated via Equations 1 to 3. For example, the distance to the object from the pressure transducer, may be determined as half the distance the induced pressure wave 300 travels from the time of the pressure wave inducement to the time the pressure response 302. For example, the time ($t_{pw}$) for the pressure wave to travel to the object/target and back to the reference point (e.g., the pressure transducer) is illustrated between the induced pressure wave 300 and the pressure response 302.

For example, at about 4 seconds, the induced pressure wave 300 is measured by the pressure transducer. At about 38 seconds the pressure response 302 is measured by the pressure transducer. A half-way point (e.g., at about 21 seconds) may indicate the time the pressure response is created (e.g., time of contact between the induced pressure wave 300 and the object/target).

Figure 4:
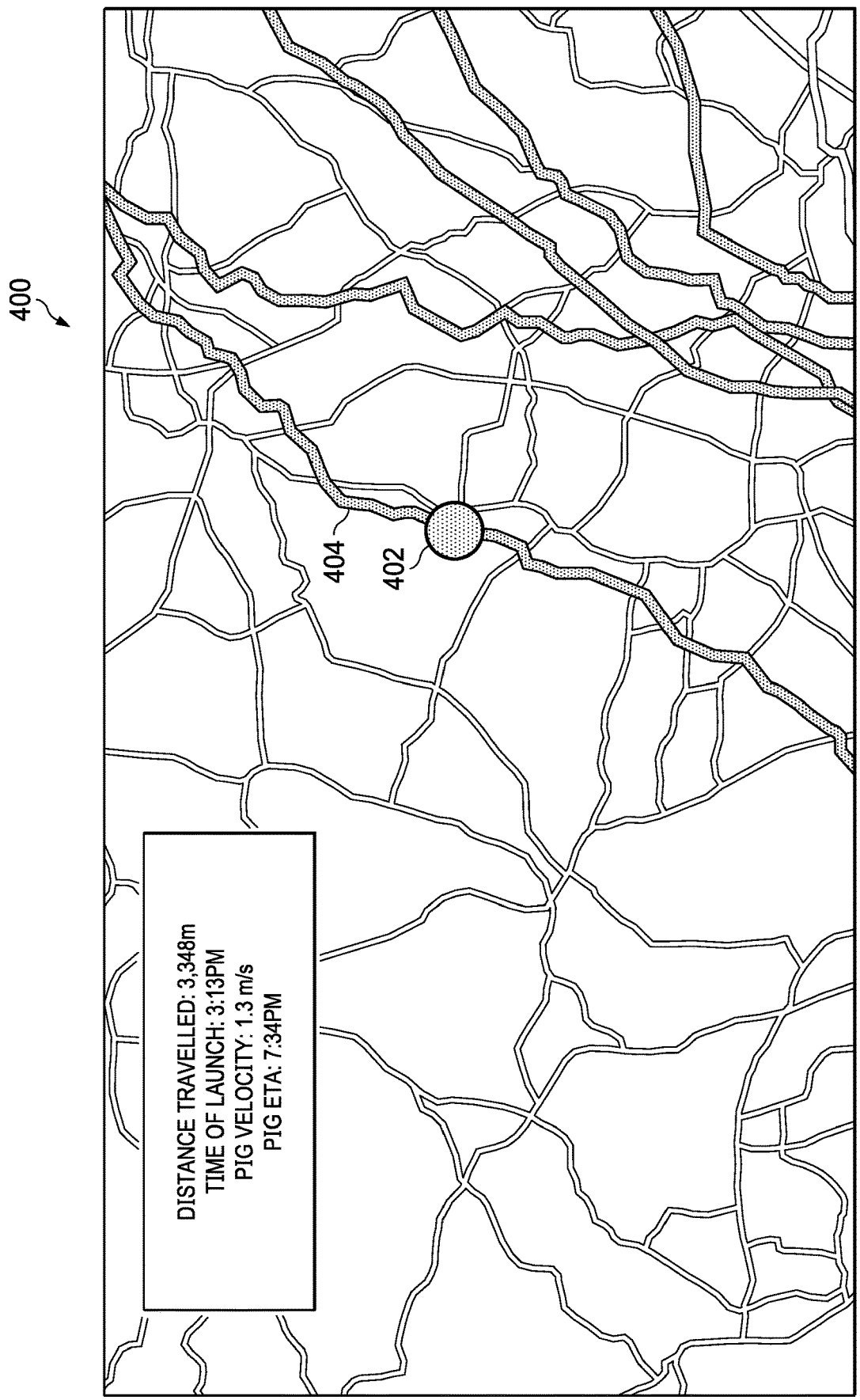
FIG. 4 illustrates a map of a pipeline during object tracking, in accordance with examples of the present disclosure.

FIG. 4 illustrates a map 400 illustrating tracking of an object 402 along a pipeline 404, in accordance with examples of the present disclosure. The map 400 may be accessed by a user via a web portal and may be accessible via the system controller 110 (e.g., shown on FIG. 1), for example. Additionally, information such as distance traveled; time of launch; object velocity; and object estimated time of arrival may be displayed and also accessed via the web portal. Onsite requirement for processing data may include a 240-volt or 110-volt power supply; internet connection; and a tie-in point for the pressure transducer into the pipeline at the pig launcher or at the pig receiver. In certain examples, data that may be required for implementation of the techniques described herein may include pipeline route data for maps and estimated time of arrival (ETA) calculations; gas properties; flow rate; and temperature profile(s).

In certain examples, systems and methods of the present disclosure may be applicable to either a temporary installation or a permanent installation. For the permanent installation, the system or method may be triggered by a pig signaler or detector, or by an operator manually initiating the techniques described herein with a button or software interface, for example.

Accordingly, the systems and methods of the present disclosure may allow for identification of an object(s) in conduits such as pipelines and/or wellbores and provide real-time location data for the object; object speed in a conduit; estimated arrival times; and automated warning of the object speed. Equipment may be connected to only one end of a conduit, and tracking may be performed along the entire length of the conduit, not just progress past set locations. Additionally, the systems and methods may provide for increased accuracy and distance capability over other acoustic methods to allow for an accurate assessment of time duration for operating a pig in the pipeline ("pigging"). For example, numerous sensors positioned along a pipeline to track the pig, such as microphones or externally mounted pig-tracking devices are not required. The systems and methods may include any of the various features disclosed herein, including one or more of the following statements.

Statement 1. A system comprises a vessel comprising a pressurized fluid, a valve positioned to control a flow of the pressurized fluid into the conduit to induce at least one pressure wave directed at the object, a pressure transducer in fluid communication with the conduit, the pressure transducer positioned to measure at least one pressure response in the conduit due to contact of the at least one pressure wave with the object, and a system controller operable to: receive pressure data from the pressure transducer, wherein the pressure data includes at least one pressure response and determines a distance of the object in the conduit, relative to a reference point, based on the at least one pressure response.

Statement 2. The system of the statement 1, wherein a pressure in the conduit ranges from ambient pressure to 10 bar.

Statement 3. The system of the statement 1 or the statement 2, wherein the system controller is operable to open the valve for less than 5 seconds to induce the at least one pressure wave.

Statement 4. The system of any one of the preceding statements, wherein a sampling rate of the pressure transducer is at least 50 Hertz.

Statement 5. The system of any one of the preceding statements, wherein the pressurized fluid comprises a gas.

Statement 6. The system of any one of the preceding statements, wherein the pressurized fluid comprises a liquid.

Statement 7. A method for non-intrusively tracking an object in a conduit, the method comprising: manipulating a valve to release a pressurized fluid into the conduit from a vessel, to induce at least one pressure wave in the conduit; measuring, with a pressure transducer, at least one pressure response in the conduit due to contact of at least one pressure wave with the object; and determining a distance of the object relative to a reference point, based on the at least one pressure response.

Statement 8. The method of the statement 7, further comprising releasing a gas into the conduit for less than 5 seconds.

Statement 9. The method of the statement 7 or the statement 8, further comprising releasing a liquid into the conduit for less than 5 seconds.

Statement 10. The method of any one of the statements 7-9, further comprising inducing at least two positive pressure waves in the conduit.

Statement 11. The method of any one of the statements 7-10, further comprising providing continuous real-time location updates of the object in the conduit.

Statement 12. The method of any one of the statements 7-11, further comprising allowing access to a map that provides a location of the object in real-time.

Statement 13. The method of any one of the statements 7-12, further comprising determining at least a velocity, a distance traveled, a time of launch, object velocity, or an estimated time of arrival for the object.

Statement 14. The method of any one of the statements 7-13, further comprising communicating a warning based on a velocity of the object in the conduit.

Statement 15. The method of any one of the statements 7-14, further comprising sampling pressure data at a frequency that is at least 50 Hertz.

Statement 16. A method for non-intrusively tracking an object in a conduit, the method comprising: controlling a flow of fluid into the conduit to induce at least one pressure wave in the conduit, wherein a pressure in the conduit ranges from ambient pressure to 10 bar; measuring at least one pressure response in the conduit due to contact of the at least one pressure wave with the object; and determining a distance of the object relative to a reference point, based on the at least one pressure response.

Statement 17. The method of the statement 16, further comprising manipulating a valve for less than 5 seconds to release the fluid from a vessel into the conduit.

Statement 18. The method of the statement 16 or 17, further comprising sampling pressure data in the conduit at a rate of 50 Hertz or higher.

Statement 19. The method of any one of the statements 16-18, further comprising indicating a location of the object.

Statement 20. The method of any one of the statements 16-19, further comprising determining a distance of the object relative to a pressure wave inducement location.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for non-intrusively tracking an object in a conduit, the system comprising:
    a vessel comprising a pressurized fluid;
    a valve positioned to control a flow of the pressurized fluid into the conduit to induce at least one pressure wave directed at the object;
    a pressure transducer in fluid communication with the conduit, the pressure transducer positioned to measure at least one pressure response in the conduit due to contact of the at least one pressure wave with the object; and
    a system controller operable to:
        receive pressure data from the pressure transducer, wherein the pressure data includes the at least one pressure response; and
        determine a distance of the object in the conduit, relative to a reference point, based on the at least one pressure response.

2. The system of claim 1, wherein a pressure in the conduit ranges from ambient pressure to 10 bar.

3. The system of claim 1, wherein the system controller is operable to open the valve for less than 5 seconds to induce the at least one pressure wave.

4. The system of claim 1, wherein a sampling rate of the pressure transducer is at least 50 Hertz.

5. The system of claim 1, wherein the pressurized fluid comprises a gas.

6. The system of claim 1, wherein the pressurized fluid comprises a liquid.

7. A method for non-intrusively tracking an object in a conduit, the method comprising:
    manipulating a valve to release a pressurized fluid into the conduit from a vessel, to induce at least one pressure wave in the conduit;
    measuring, with a pressure transducer, at least one pressure response in the conduit due to contact of the at least one pressure wave with the object; and
    determining a distance of the object relative to a reference point, based on the at least one pressure response.

8. The method of claim 7, further comprising releasing a gas into the conduit for less than 5 seconds.

9. The method of claim 7, further comprising releasing a liquid into the conduit for less than 5 seconds.

10. The method of claim 7, further comprising inducing at least two positive pressure waves in the conduit.

11. The method of claim 7, further comprising providing continuous real-time location updates of the object in the conduit.

12. The method of claim 11, further comprising allowing access to a map that provides a location of the object in real-time.

13. The method of claim 12, further comprising determining at least a velocity, a distance traveled, a time of launch, object velocity, or an estimated time of arrival for the object.

14. The method of claim 7, further comprising communicating a warning based on a velocity of the object in the conduit.

15. The method of claim 7, further comprising sampling pressure data at a frequency that is at least 50 Hertz.

16. A method for non-intrusively tracking an object in a conduit, the method comprising:
    controlling a flow of fluid into the conduit to induce at least one pressure wave in the conduit, wherein a pressure in the conduit ranges from ambient pressure to 10 bar;
    measuring at least one pressure response in the conduit due to contact of the at least one pressure wave with the object; and
    determining a distance of the object relative to a reference point, based on the at least one pressure response.

17. The method of claim 16, further comprising manipulating a valve for less than 5 seconds to release the fluid from a vessel into the conduit.

18. The method of claim 16, further comprising sampling pressure data in the conduit at a rate of 50 Hertz or higher.

19. The method of claim 16, further comprising indicating a location of the object.

20. The method of claim 16, further comprising determining a distance of the object relative to a pressure wave inducement location.

* * * * *